United States Patent [19]

Kim

[11] Patent Number: 5,422,728

[45] Date of Patent: Jun. 6, 1995

[54] MOTION SIGNAL RECORDING AND REPRODUCING CIRCUIT

[75] Inventor: Yong-je Kim, Suwon, Rep. of Korea

[73] Assignee: SamSung Electronics Co., Ltd., Kyungki-do, Rep. of Korea

[21] Appl. No.: 711,972

[22] Filed: Jun. 7, 1991

[30] Foreign Application Priority Data

Oct. 31, 1990 [KR] Rep. of Korea ............... 90-17585

[51] Int. Cl.$^6$ ............................................. H04N 9/89
[52] U.S. Cl. .................... 358/320; 358/337; 358/339
[58] Field of Search ............ 358/335, 310, 320, 337, 358/136, 137, 140, 222, 343, 324, 339, 105, 314, 336, 340; 360/22, 33.1; 348/423, 620; H04N 9/89

[56] References Cited

U.S. PATENT DOCUMENTS

| | | | |
|---|---|---|---|
| 4,403,250 | 9/1983 | Kellar | 358/335 |
| 4,789,894 | 12/1988 | Cooper | 358/335 |
| 4,802,005 | 1/1989 | Kondo | 358/136 |
| 4,831,463 | 5/1989 | Faroudja | 358/310 |
| 4,882,625 | 11/1989 | Akiyama | 358/137 |
| 4,950,522 | 5/1990 | Takemoto et al. | 358/339 |
| 4,953,168 | 8/1990 | Okada | 358/343 |
| 4,969,039 | 11/1990 | Koga et al. | 358/335 |
| 5,027,222 | 6/1991 | Shinbo et al. | 360/19.1 |
| 5,060,077 | 10/1991 | Koya et al. | 358/335 |
| 5,113,262 | 5/1992 | Strolle et al. | 358/310 |

FOREIGN PATENT DOCUMENTS

| | | |
|---|---|---|
| 102782 | 3/1984 | European Pat. Off. . |
| 181215A1 | 3/1986 | European Pat. Off. . |
| 4039709A1 | 7/1991 | Germany . |
| WO91078-47A1 | 5/1991 | WIPO . |

Primary Examiner—Tommy P. Chin
Assistant Examiner—Huy Nguyen
Attorney, Agent, or Firm—Robert E. Bushnell

[57] ABSTRACT

A motion signal recording circuit in a digital video recording apparatus for recording a motion signal with a video signal comprises a motion signal separator for separating the motion signal from a digital video signal, an error correcting encoder for encoding by adding a parity word to the separated motion signal, and a recording device for recording the encoded motion signal to the magnetic recording media. Since the error correcting parity word is added to the motion signal in recording, the errors generated at the motion signal during transmission are eliminated by the parity word added to the motion signal in reproducing, so that deterioration of the picture quality is prevented.

21 Claims, 1 Drawing Sheet

MOTION SIGNAL RECORDING AND REPRODUCING CIRCUIT

BACKGROUND OF THE INVENTION

The present invention relates to a digital video recording and reproducing apparatus for recording on or reproducing for a recording medium by digitally processing the video signal.

Generally, a video recording and reproducing apparatus modulates both a luminance signal and a chrominance signal separated from the video signal, then records the modulated luminance and chrominance signal on a recording medium. During reproduction a demodulated luminance component is mixed with a demodulated chrominance component after demodulating the modulated luminance and chrominance component from the recording media.

Therefore, in the video recording and reproducing apparatus, the luminance signal and chrominance signal should be accurately separated from the composite video signal to ensure reliable reproduction of the original picture.

The chrominance signal transmitted with the chrominance carrier of the video signal is distributed within the bandwidth of approximately 3.58 MHz±0.5 MHz which is the center frequency of the chrominance carrier, while the luminance signal is distributed up to the frequency band of the chrominance signal according to the moving quantity of the pixels to the video region i.e., the magnitude of the motion signal.

As a result, the chrominance signal can be separated accurately from the video signal by means of a horizontal comb filter, but the luminance signal is separated accurately from the video signal by a vertical comb low pass filter or a temporal comb low pass filter based on whether the video signal is a moving picture or a static picture i.e., based on the moving quantity of the pixel. The video signal can also be separated by utilizing both vertical comb low pass filter and a temporal comb low pass filter.

Therefore, in the video signal recording and reproducing apparatus, the motion signal is used to separate the luminance signal from the video signal in recording, and is used to reconstruct the luminance signal read out from the recording media during reproduction.

U.S. patent application Ser. No. 07/569,029 on the invention entitled "An improved video signal recording system" filed on Aug. 17, 1990, by Samsung Electronics Co., Ltd., describes a technique for processing the video signal by recording the motion signal together with the video signal, and then reproducing it.

In the U.S. patent application Ser. No. 07/569,029, the motion signal is mixed with the chrominance signal and is recorded on the recording media.

Therefore, errors may be contained in the motion signal in reproducing due to the state of the recording media and noise. If the errors are contained in the motion signal, the construction ratio of the high band component to the low band component of the luminance signal is different from the original construction ratio when the luminance signal is reconstructed. As a result, image quality deteriorates.

SUMMARY OF THE INVENTION

It is an object of the present invention to provide a motion signal recording and reproducing circuit for preventing errors in recording or reproducing a motion signal on a recording media.

To accomplish the above object, a motion signal recording circuit comprising: a chrominance and motion signal separator separating a motion signal and chrominance signal from a digital video signal, an error correcting encoder for adding a parity word to the separated motion signal, a chrominance/motion signal mixer for mixing an output of the encoder with the separated chrominance signal, a standard chrominance signal recorder for processing the mixed chrominance and motion signals for recordation on the recording media, and a recording device for recording an output of the standard chrominance signal recorder on the recording media.

Also accordance with the present invention, a motion signal reproducing circuit comprises a readout device for reading out the chrominance and motion signals from the recording media, a standard chrominance signal reproducer for reproducing the chrominance and motion signals which are read out from the recording media, a chrominance/motion signal separator for separating the motion signal and chrominance signal from the reproduced signal, and an error correcting decoder for correcting the errors of the separated motion signal by the parity bit contained in the separated motion signal.

BRIEF DESCRIPTION OF THE DRAWINGS

The object and features of the present invention will become more readily apparent by the following detailed description of the preferred embodiment in conjunction with the accompanying drawings in which.

DETAILED DESCRIPTION OF THE INVENTION

Figure 1:
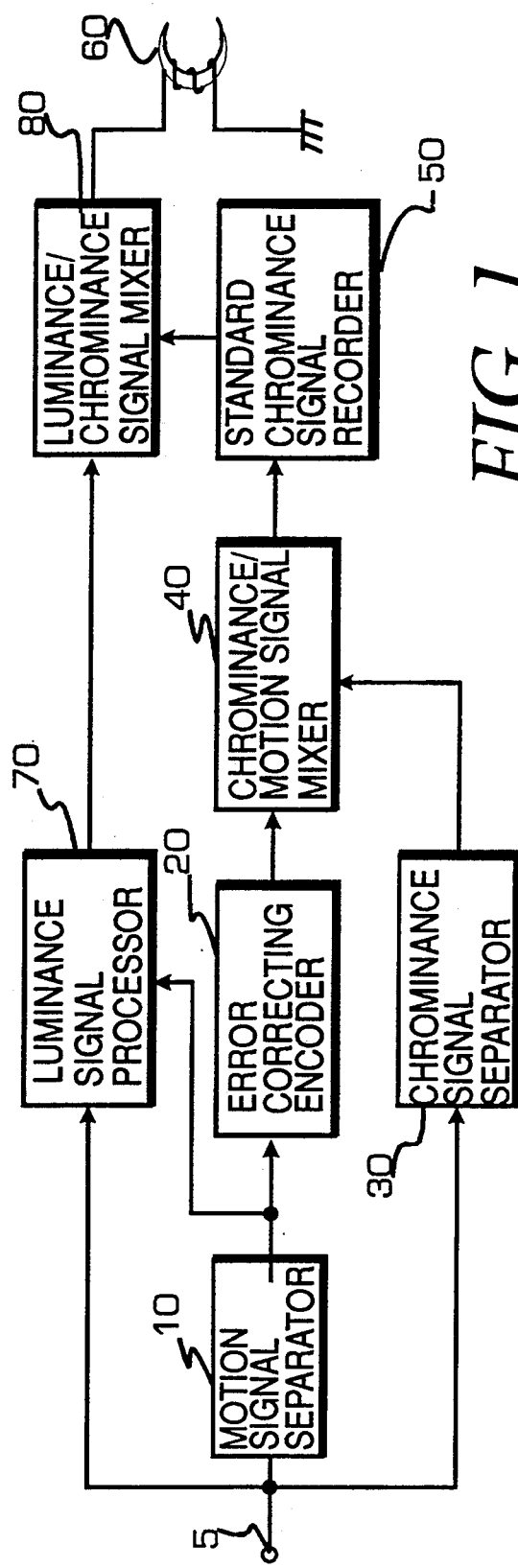
FIG. 1 is a block diagram of an embodiment of a motion signal recording circuit according to the present invention.

In FIG. 1, an input terminal 5 is connected to the output of an A/D converter (not shown) to receive a digital composite video signal. The input terminal 5 is also connected to input terminals of a luminance signal processor 70, a motion signal separator 10 and a chrominance signal separator 30.

An output terminal of the motion signal separator 10 is connected to a control terminal of the luminance signal processor 70 and an input terminal of an error correcting encoder 20. An output terminal of the error correcting encoder 20 is coupled with a first input terminal of a chrominance/motion signal mixer 40. An output terminal of the chrominance signal separator 30 is coupled with a second input terminal of the chrominance/motion signal mixer 40. An output terminal of the chrominance/motion signal mixer 40 is connected to the input terminal of a standard chrominance signal recorder 50. An output terminal of the standard chrominance signal recorder 50 is coupled with a first input terminal of a luminance/chrominance signal mixer 80. The output terminal of the luminance signal processor 70 is connected to a second input terminal of the luminance/chrominance signal mixer 80. An output terminal of the luminance/chrominance signal mixer 80 is coupled with a magnetic head 60.

In operation, the motion signal separator 10 separates the motion signal representing a moving image from the composite digital video signal.

The error correcting encoder 20 error-correction-encodes the motion signal by adding the parity data for error connection to the motion signal.

The chrominance signal separator 30 separates the chrominance signal by filtering the digital composite video signal.

The chrominance/motion signal mixer 40 mixes the correction-encoded motion signal with the chrominance signal. The luminance signal processor 70 separates the luminance signal from the digital composite video signal, and controls the ratio of high frequency component to the low frequency components of the separated luminance signal according to the output of the motion signal separator 10.

The standard chrominance signal recorder 50 modulates the chrominance signal to which the error-correction-encoded motion signal is added for recording on the recording media, and supplies the modulated signal to the luminance/chrominance signal mixer 80.

The luminance/chrominance signal mixer 80 mixes the output of the standard chrominance signal recorder 50 with the output of the luminance signal processor 70.

The magnetic head 60 records the output of the luminance/chrominance signal mixer 80 on the magnetic recording media.

Figure 2:
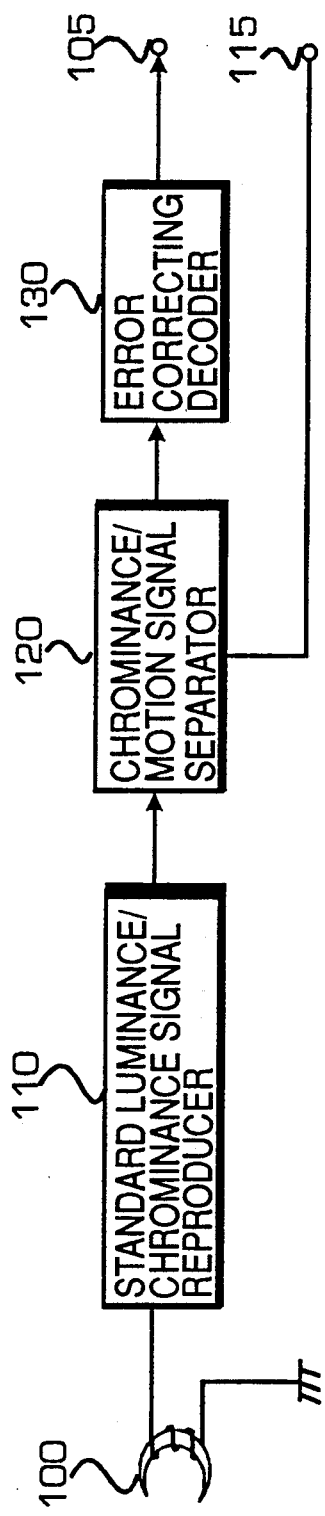
FIG. 2 is a block diagram of another embodiment of a motion signal reproducing circuit according to the present invention.

FIG. 2 shows another embodiment of a motion signal reproducing circuit according to the present invention.

In FIG. 2, a magnetic head 100 is connected to an input terminal of a standard luminance chrominance signal reproducer 110. An output terminal of the standard chrominance signal reproducer 110 is coupled to an input terminal of a chrominance/motion signal separator 120. The chrominance/motion signal separator 120 is provided with a first output terminal connected to an input terminal of a error correcting decoder 130, and a second output terminal connected to an output terminal 115. An output terminal of the error correcting decoder 130 is coupled with a first output terminal 105.

In operation, the magnetic head 100 reads the modulated chrominance and luminance signals recorded on the magnetic recording tape. At this time, the chrominance signal which is readout is mixed with the error-correction-encoded motion signal. The standard luminance chrominance signal reproducer 110 demodulates the modulated chrominance signal which is readout by the magnetic head 100 and generates the chrominance signal with which the error-correction-encoded motion signal is mixed. The chrominance/motion signal separator 120 separates the chrominance signal including the error-correction-encoded motion signal into the error-correction-encoded motion signal and the chrominance signal, then supplies the chrominance signal to the output terminal 115, and supplies the error-correction-encoded motion signal to the error correcting decoder 130.

The error correcting decoder 130 corrects errors in the motion signal by reference to the parity bit included in the error-correction-encoded motion signal and supplies the error-corrected motion signal to the output terminal 105.

The first output terminal 105 is connected to a frequency unfolding device (not shown).

Further, the second output terminal 115 is connected to a mixer which is not shown for mixing the luminance signal with the chrominance signal.

As mentioned above, according to the present invention, since the error correcting parity word is added to the motion signal in recording, the errors generated at the motion signal during transmission are eliminated by the parity word added to the motion signal in reproduction, so that deterioration of the picture quality is prevented.

What is claimed is:

1. A motion signal recording circuit in a digital video recording apparatus for recording a motion signal, said motion signal recording circuit comprising:
   a motion signal separator for separating a detected motion signal from a digital video signal, said detected motion signal being indicative of image motion in said digital video signal;
   an error correcting encoder for performing error-correction-encoding by adding parity words to said detected motion signal to generate an error-correction-encoded motion signal; and
   recording means for recording said error-correction-encoded motion signal on recording media.

2. A motion signal recording circuit as claimed in claim 1, further comprising:
   a chrominance signal separator for separating a chrominance signal from said digital video signal; and
   a chrominance/motion signal mixer for generating a combined chrominance and motion signal by mixing said separated chrominance signal with said error-correction-encoded motion signal, said recording means recording said error-correction-encoded motion signal by recording said combined chrominance and motion signal on said recording media.

3. A motion signal recording circuit as claimed in claim 2, wherein said recording means comprises;
   chrominance signal recording means for processing said combined chrominance and motion signal for recordation on said recording media; and
   a recording device for recording the processed combined chrominance and motion signal generated by said chrominance signal recording means on said recording media.

4. A motion signal recording circuit as claimed in claim 3, wherein said recording device is a magnetic recording head.

5. A motion signal reproducing circuit in a digital video reproducing apparatus for reproducing a recorded motion signal from recording media, said recorded motion signal being indicative of image motion in a luminance signal recorded on said recording media, said circuit comprising:
   reproducing means for reproducing said recorded motion signal recorded on said recording media; and
   an error correcting decoder for generating an error-corrected motion signal by correcting errors in said recorded motion signal reproduced by said reproducing means by reference to parity words contained in said recorded motion signal.

6. A motion signal reproducing circuit as claimed in claim 5, further comprising a chrominance/motion signal separator for separating a chrominance signal and said recorded motion signal from a combined chrominance/motion signal generated by said reproducing means, said chrominance/motion signal separator being connected between said reproducing means and said error correcting decoder for providing said recorded motion signal to said error correcting decoder, and said reproducing means including a readout device for reading said combined chrominance and motion signal recorded on said recording media, and a chrominance signal reproducing device for processing the output of said readout device and for supplying said combined chrominance/motion signal to said chrominance/motion signal separator.

7. A video signal processing circuit for a digital video recording apparatus, said video signal processing circuit comprising:
   chrominance signal separator means for detecting chrominance signals in composite video signals;
   motion signal separator means for generating separated motion signals representing image motion in said composite video signals;
   error correcting encoder means for generating error-correction-encoded motion signals by error-correction-encoding said separated motion signals by adding parity information; and
   chrominance/motion signal mixer means for generating combined chrominance and motion signals for recordation by mixing the detected chrominance signals with said error-correction-encoded motion signals.

8. A video signal processing circuit as claimed in claim 7, further comprising luminance signal processor means for processing luminance signals contained in said composite video signals.

9. A video signal processing circuit as claimed in claim 8, further comprising luminance/chrominance signal mixer means for mixing the processed luminance signals with said combined chrominance and motion signals to generate mixed signals.

10. A video signal processing circuit as claimed in claim 9, further comprising chrominance signal recording means for processing and modulating said combined chrominance and motion signals received by said luminance/chrominance signal mixer means.

11. A video signal processing circuit as claimed in claim 10, further comprising recording means for recording said mixed signals on a recording media.

12. A video signal processing circuit as claimed in claim 11, wherein said recording means is a magnetic recording head.

13. A video signal processing circuit for digital video reproducing apparatus, said circuit comprising:
   reproducing means for reproducing video signals recorded on recording media;
   chrominance/motion signal separator means for separating combined chrominance and motion signals in said video signals into separated chrominance signals and separated motion signal, said separated motion signals being indicative of image motion in said video signals;
   error correcting decoder means for generating error-corrected motion signals by correcting errors said separated motion signals received from said chrominance/motion signal separator means by reference to parity information contained in said separated motion signals.

14. A video signal processing circuit as claimed in claim 13, wherein said reproducing means comprises:
   reading means for detecting said video signals in said reproducing means; and
   chrominance signal reproducing means for processing and demodulating said video signals received from said reading means to provide said combined chrominance and motion signals to said chrominance/motion signal separator means.

15. A video signal processing circuit as claimed in claim 7, wherein said composite video signals are digital signals.

16. A video signal processing circuit as claimed in claim 8, further comprised of said luminance signal processor means controlling a ratio of high frequency components to low frequency components of said luminance signals in response to said detected motion signals.

17. A video signal processing circuit for a digital video recording apparatus, said video signal processing circuit comprising:
   chrominance signal separator means for detecting chrominance signals in composite video signals;
   motion signal separator means for generating detected motion signals representing image motion in said composite video signals;
   error correcting encoder means for generating error-correction-encoded motion signals by adding error correction data to said detected motion signals; and
   chrominance/motion signal mixer means for generating combined chrominance and motion signals for recordation by mixing the detected chrominance signals with said error-correction-encoded motion signals.

18. A video signal processing circuit as claimed in claim 17, wherein said error correction data is parity data.

19. A video signal processing circuit for digital video reproducing apparatus, said circuit comprising:
   reproducing means for reproducing video signals recorded on recording media;
   chrominance/motion signal separator means for separating received motion signals and received chrominance signals from said video signals, said motion signal being indicative of image motion in said video signals;
   error correcting decoder means for generating error-corrected motion signals by correcting errors in said received motion signals by reference to error correction data contained in said received motion signals.

20. A video signal processing circuit as claimed in claim 19, wherein said error correction data is parity data.

21. A video signal processing circuit for a digital video recording apparatus, said video signal processing circuit comprising:
   chrominance signal separator means for detecting chrominance signals in received composite video signals;
   motion signal separator means for generating detected motion signals in response to said received composite video signals, said detected motion signals representing image motion in said composite video signals; luminance signal processing mean for separating luminance signals from said composite video signals in response to said detected motion signals;
   error correcting encoder means for generating error-correction-encoded motion signals by adding parity data to said detected motion signals;
   chrominance/motion signal mixing means for generating combined chrominance/motion signals by mixing said chrominance signals and said error-correction-encoded motion signals;

chrominance signal recording means for generating modulated signals by modulating said combined chrominance/motion signals;
luminance/chrominance mixing means for generating recording signals by mixing said modulated signals and said luminance signals; and
magnetic head means for recording said recording signals on magnetic tape.

* * * * *